US009638122B2

(12) United States Patent
Smith et al.

(10) Patent No.: US 9,638,122 B2
(45) Date of Patent: May 2, 2017

(54) METHOD TO DIAGNOSE SCR CATALYST

(71) Applicant: Ford Global Technologies, LLC, Dearborn, MI (US)

(72) Inventors: Jason Ronald Smith, Canton, MI (US); John Paul Bogema, Flat Rock, MI (US); Peter Mitchell Lyon, Birmingham, MI (US); John Anthony Mangion, Plymouth, MI (US); Kevin R. Murphy, Troy, MI (US); Darrin Blaine Luke, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 14/136,894

(22) Filed: Dec. 20, 2013

(65) Prior Publication Data

US 2015/0176512 A1    Jun. 25, 2015

(51) Int. Cl.
| | | |
|---|---|---|
| F01N 3/00 | (2006.01) | |
| F02D 41/02 | (2006.01) | |
| F01N 3/20 | (2006.01) | |
| F01N 11/00 | (2006.01) | |
| F02D 41/14 | (2006.01) | |
| F02D 41/40 | (2006.01) | |

(52) U.S. Cl.
CPC ....... *F02D 41/0235* (2013.01); *F01N 3/2066* (2013.01); *F01N 11/00* (2013.01); *F01N 2550/02* (2013.01); *F01N 2900/1602* (2013.01); *F01N 2900/1621* (2013.01); *F02D 41/1461* (2013.01); *F02D 41/1463* (2013.01); *F02D 41/401* (2013.01); *Y02T 10/24* (2013.01); *Y02T 10/47* (2013.01)

(58) Field of Classification Search
CPC ............. F01N 11/00; F01N 2900/1621; F01N 2900/1622; F01N 2900/14; F01N 2900/1402; F01N 2610/02; F01N 2560/026; F01N 2550/02
USPC .......................... 60/277, 286, 299, 295, 272
See application file for complete search history.

(56) References Cited

U.S. PATENT DOCUMENTS

| | | | | |
|---|---|---|---|---|
| 8,240,136 B2 * | 8/2012 | Kurtz et al. | ..................... | 60/295 |
| 2010/0154386 A1 * | 6/2010 | Perrin et al. | ..................... | 60/277 |

FOREIGN PATENT DOCUMENTS

| | | |
|---|---|---|
| EP | 2333261 B1 | 1/2013 |
| EP | 2410144 B1 | 3/2013 |
| WO | 2013152780 A1 | 10/2013 |

OTHER PUBLICATIONS

Kim, Yong-Wha et al., "Threshold Monitoring of Urea SCR Systems," SAE International Technical Paper 2006-01-3549, Commercial Vehicle Engineering Congress and Exhibition, Chicago, IL, Oct. 31-Nov. 2, 2006, 9 pages.
Anonymous, "Increase Overall Life Long SCR Performan," IPCOM No. 000192807, Published Feb. 3, 2010, 5 pages.

* cited by examiner

*Primary Examiner* — Audrey K Bradley
*Assistant Examiner* — Anthony Ayala Delgado
(74) *Attorney, Agent, or Firm* — Julia Voutyras; McCoy Russell LLP

(57) ABSTRACT

Methods and systems are described for an engine with a SCR system including NOx sensors upstream and downstream of catalyst. One method includes monitoring SCR performance via calculating SCR conversion efficiency at different catalyst temperatures. Further, feedgas NOx levels are artificially increased when SCR device temperature is above a threshold to obtain more reliable readings from NOx sensors.

20 Claims, 6 Drawing Sheets

METHOD TO DIAGNOSE SCR CATALYST

TECHNICAL FIELD

The present application relates to diagnosing a SCR catalyst included in an exhaust system of an internal combustion engine.

BACKGROUND AND SUMMARY

Vehicles may be equipped with various exhaust aftertreatment devices to reduce the release of exhaust emissions into the atmosphere. For example, three-way catalysts may reduce levels of various emissions including carbon monoxide and unburnt hydrocarbons while selective catalyst reduction (SCR) systems may be used to reduce levels of NOx. To ensure the aftertreatment devices are functioning optimally, various sensors may be installed upstream and/or downstream of the devices, and feedback from the sensors may be used to determine catalyst conversion efficiency and thereby, degradation in SCR devices.

An example diagnostic approach is shown by Nilsson (WO 2013/152780 A1) where NOx sensor readings are obtained during different diagnostic sequences performed when the vehicle is stationary. One diagnostic sequence includes transitioning from a high NOx to a low NOx output followed by a return to a high NOx output. A second diagnostic sequence includes using a fuel cut to induce low NOx levels while a third diagnostic sequence involves determining catalyst conversion efficiency by delivering high NOx output to a heated catalyst and varying the quantity of injected reductant from zero to a fixed amount. High NOx output is induced by providing a selected fuel injection timing, a high engine speed or applied engine loads. In each sequence, NOx sensor feedback is compared with predetermined thresholds to diagnose SCR catalyst and/or sensor performance.

The inventors herein have identified potential issues with the above approach. Not only are the various processes somewhat complicated, but reliance on stationary testing can be detrimental when the vehicle is not operated in a stationary position sufficiently. Further, the various adjustments to urea dosing as described in '780 can negatively affect emissions in a moving vehicle when performed over longer durations necessary to generate a satisfactory number of readings.

The inventors herein have recognized the above issue and identified an approach to at least partly address the issue. In one example approach, a method for monitoring a SCR catalyst system coupled to an engine in a moving vehicle is provided. The method comprises monitoring SCR conversion efficiency without any adjustments to engine operation when SCR device temperature is below a first threshold and once SCR device temperature is above the first threshold, SCR conversion efficiency is monitored after artificially inducing an increase in feedgas NOx. SCR device degradation is indicated based on conversion efficiency data obtained during both operation conditions.

For example, when SCR device temperature is below a threshold but above light-off temperature, conversion efficiency may be measured based on a relative change in NOx levels from upstream of SCR catalyst to those downstream of SCR catalyst. As such, the system may comprise two sensors to measure said NOx levels: one placed upstream of SCR device and the other placed downstream of SCR device. Additionally, any decline in conversion efficiency may be noted in this mode. Once SCR device temperature is above a threshold and in a functioning range with a higher expected conversion efficiency, feedgas NOx may be temporarily and artificially increased, for e.g. by reducing EGR (exhaust gas recirculation) flow or by advancing fuel injection timing to monitor conversion efficiency. This increase in feedgas NOx may improve signal-to-noise ratio in NOx sensors and may provide a more precise measurement of conversion efficiency. Further, SCR degradation may be confirmed if conversion efficiency in one or both operating modes is below an expected threshold.

In this way, a more accurate diagnosis of SCR catalyst performance can be made based on conversion efficiency data obtained over a range of SCR device operating temperatures and by artificially increasing feedgas NOx levels during high SCR performance to enable more reliable sensor feedback. Moreover, using a reduced EGR flow to raise feedgas NOx levels may offer stable combustion conditions, thereby, improving driveability while increasing feedgas NOx by advancing fuel injection timing can benefit fuel efficiency. In one example, by artificially raising the levels of feedgas NOx only when the SCR catalyst is expected to convert NOx more efficiently, tailpipe emissions can be maintained within acceptable limits. For example, feedgas NOx levels can be increased during highway driving conditions when SCR device is already operating in a peak NOx conversion range. In another example, EGR can be disabled during uphill driving conditions and the increased NOx output can be advantageously used to monitor SCR performance. Thus, SCR performance may be diagnosed during vehicle travel and under different driving situations with minimum intrusion on driveability and emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
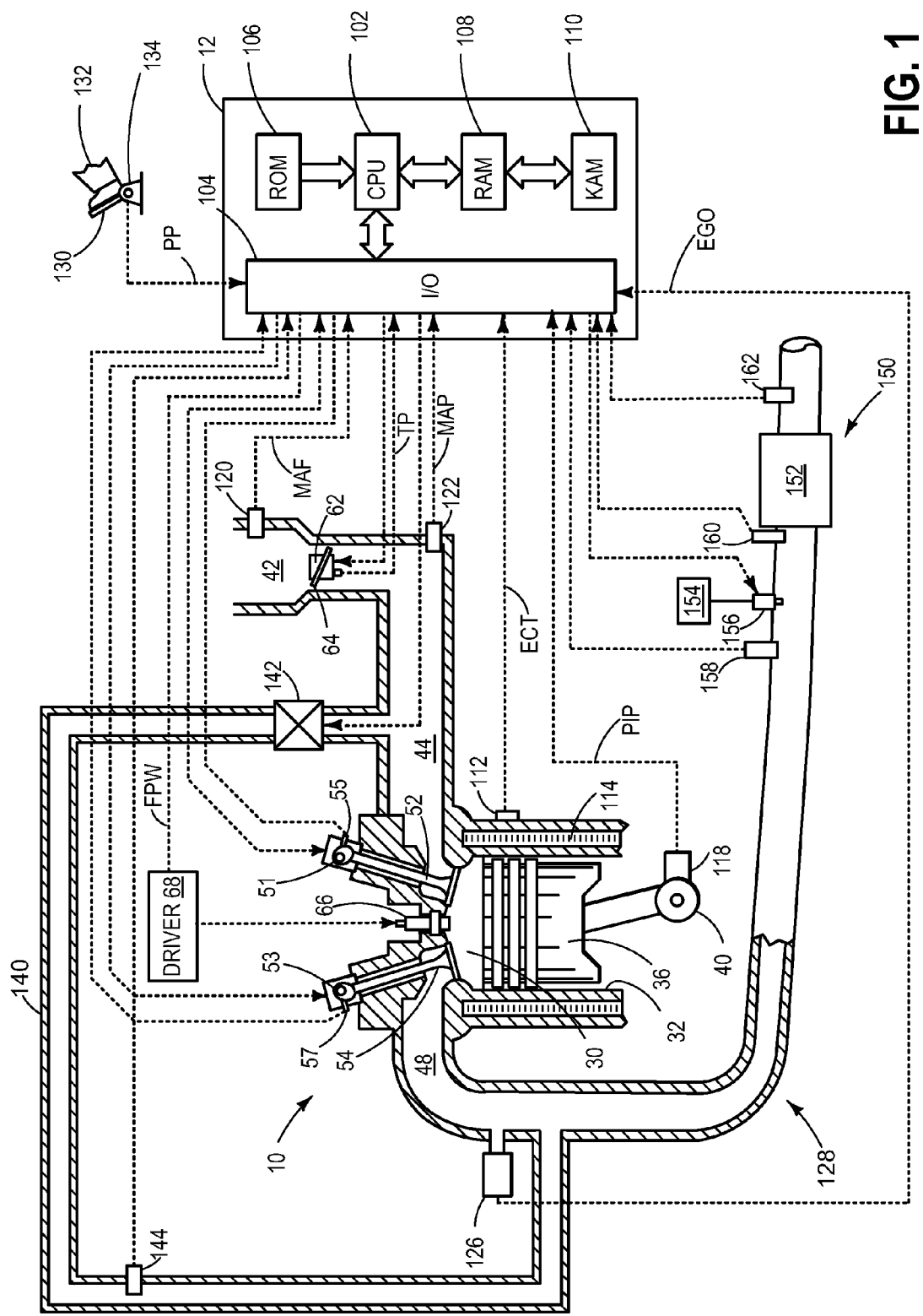
FIG. 1 portrays a schematic diagram of an engine with a SCR catalyst system.
Figure 3:
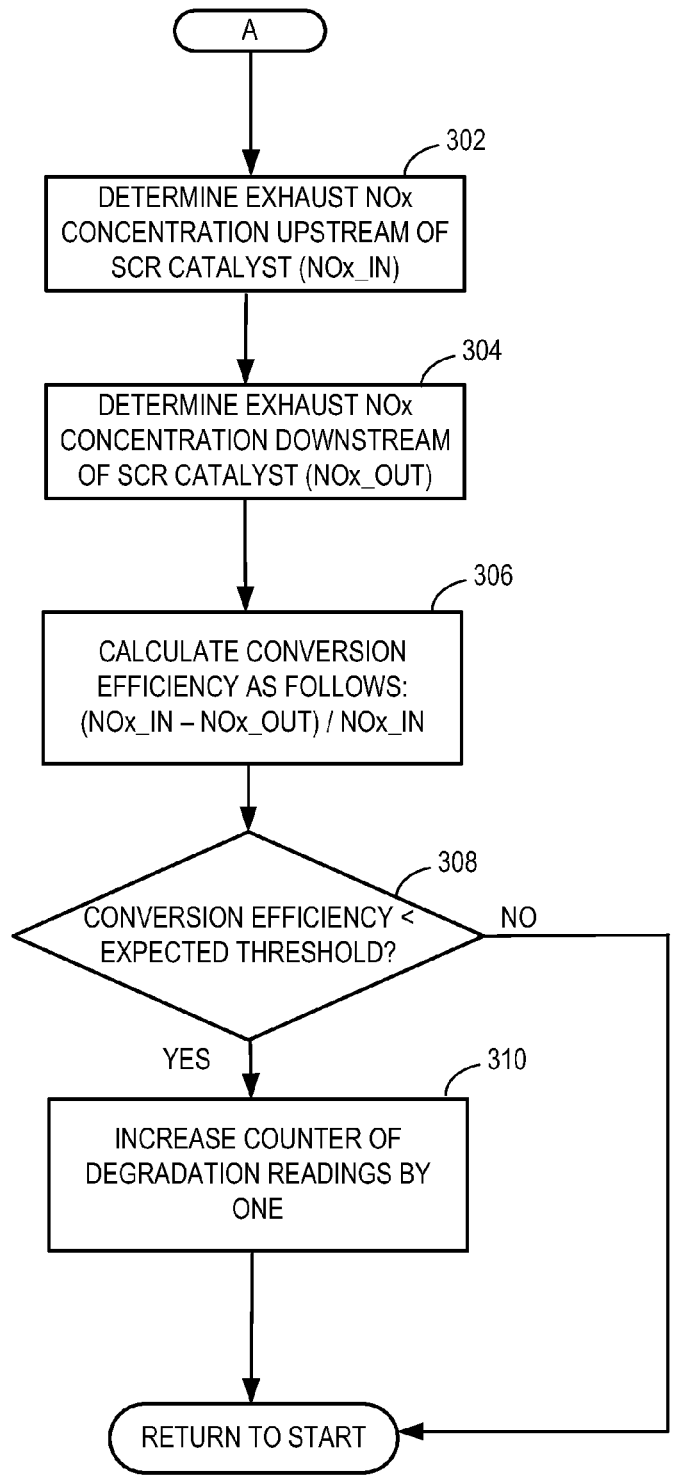
FIG. 3 shows a flowchart illustrating a routine for SCR catalyst diagnosis when SCR catalyst temperature is below a threshold.
Figure 4:
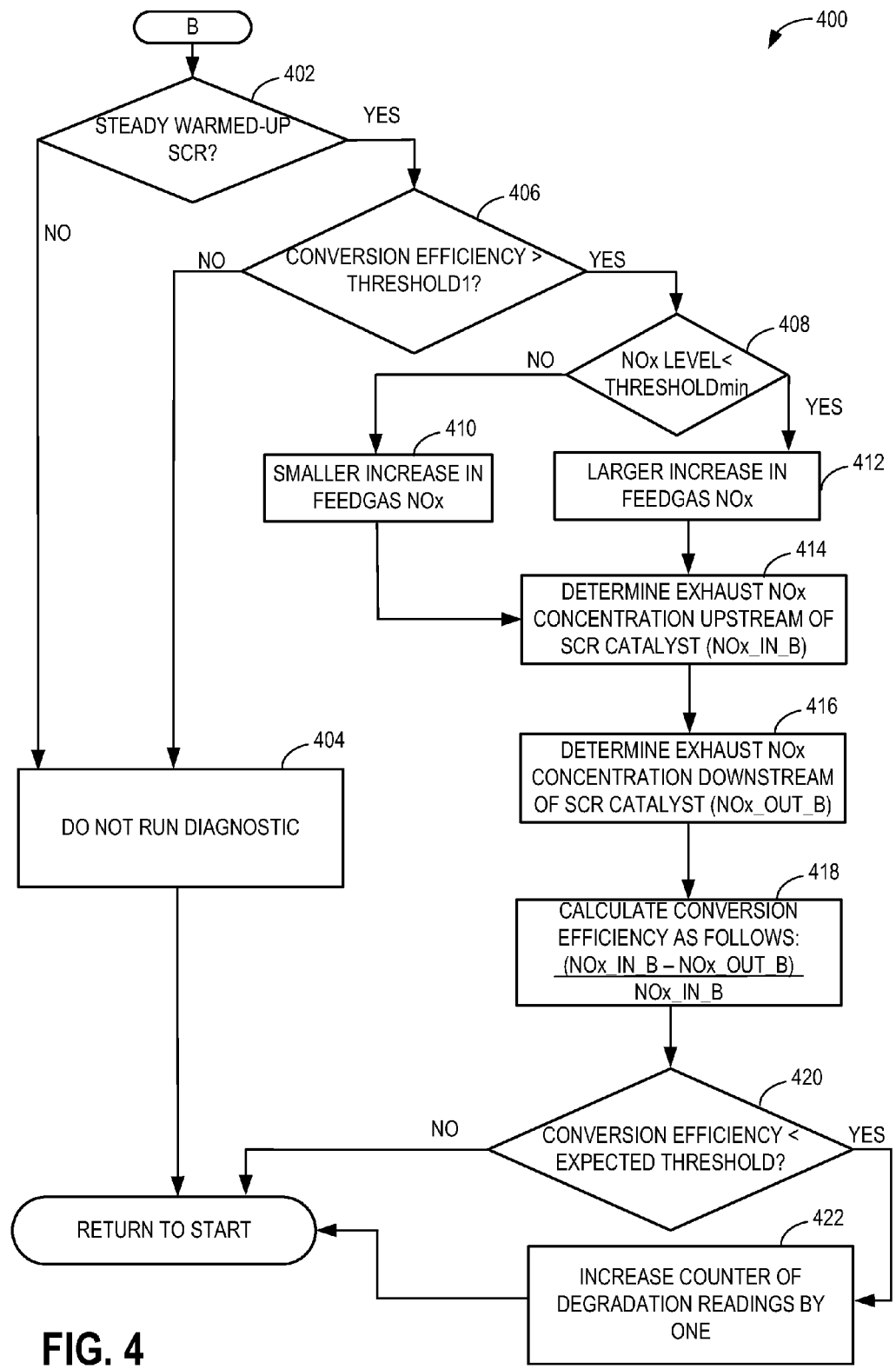
FIG. 4 portrays a flowchart demonstrating a routine for SCR catalyst diagnosis when SCR catalyst temperature is above a threshold temperature.
Figure 6:
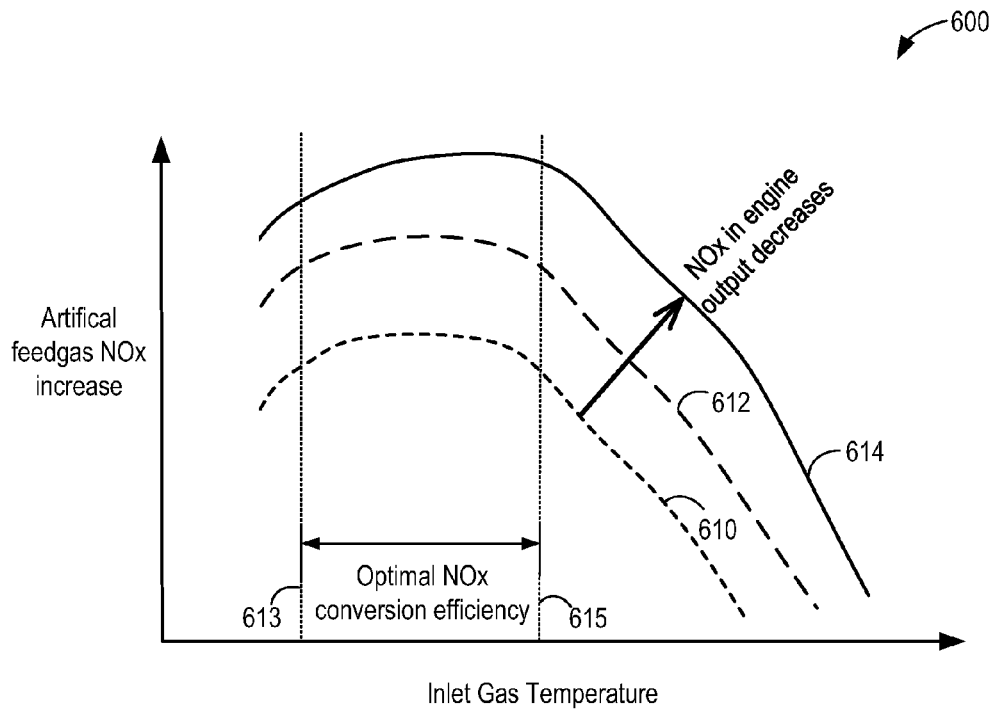
FIG. 6 shows a graph depicting the artificial increase necessary in feedgas NOx based on initial NOx levels in exhaust gases exiting the engine.
Figure 7:
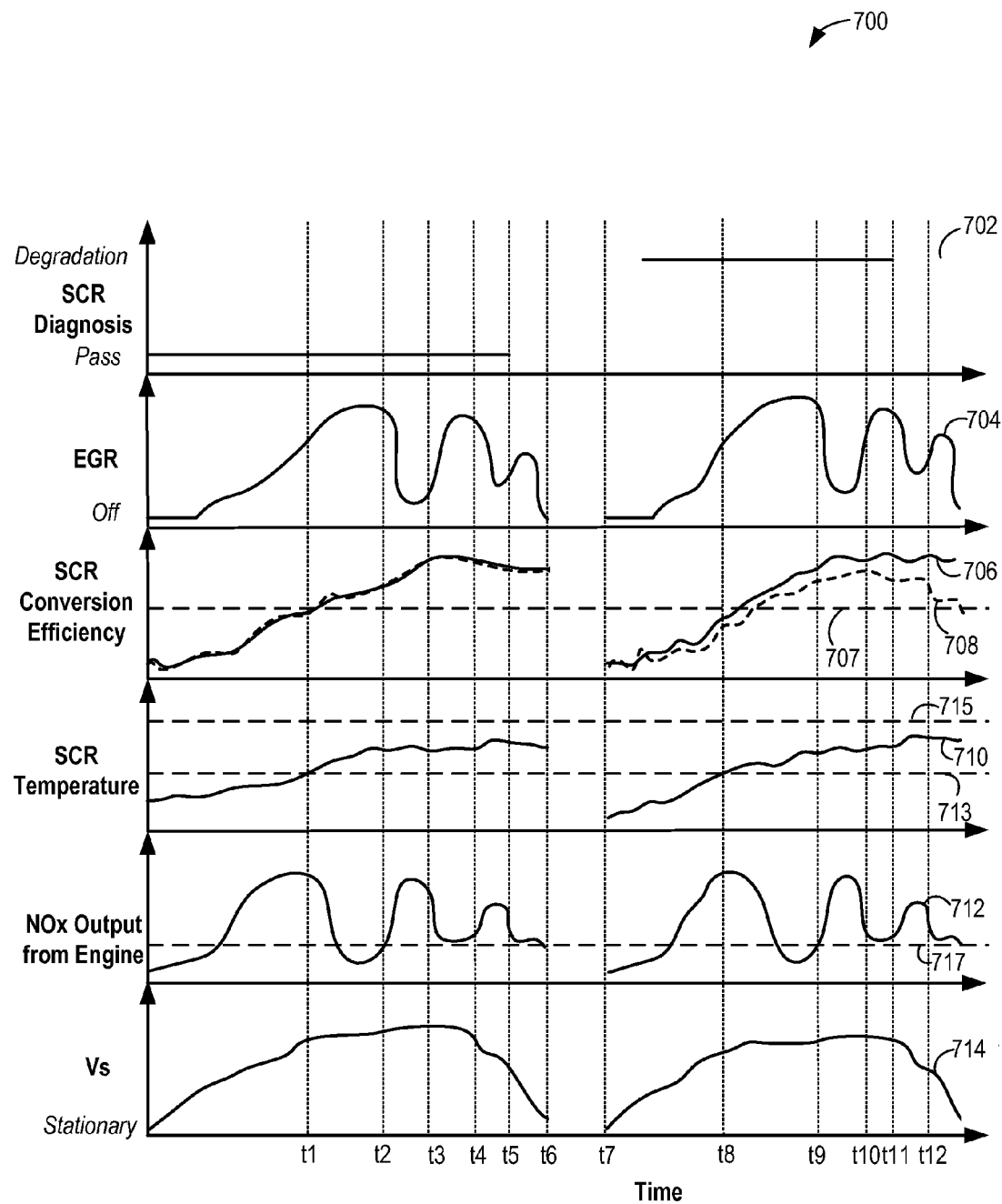
FIG. 7 is an example operation of the SCR diagnostic under various operating conditions according to this disclosure.

The following description relates to methods and systems for detecting SCR degradation in the exhaust system of an engine, such as that shown in FIG. 1. A controller of the engine may be configured to perform a routine, such as the example routine of FIG. 2, to select a mode of SCR diagnosis based on a temperature of the catalyst. FIGS. 3 and 4 show two different modes and the routines that a controller may perform in each mode based on the temperature of the SCR catalyst and feedgas NOx levels in the exhaust. When SCR catalyst is operating is within its peak conversion range (FIG. 5), NOx levels in exhaust gases exiting the engine may be artificially enhanced and the necessary increase may depend on the original levels of NOx in exhaust gases (FIG. 6). Artificially increasing feedgas NOx levels to the SCR catalyst can help improve the accuracy of NOx sensor readings during selected conditions. By incorporating conversion efficiency results obtained over a range of SCR operating temperatures, a more accurate determination of SCR degradation can be made (FIG. 7).

Referring now to FIG. 1, it shows a schematic diagram with one cylinder of multi-cylinder engine 10, which may be included in a propulsion system of a vehicle. Engine 10 may be controlled at least partially by a control system including a controller 12 and by input from a vehicle operator 132 via an input device 130. In this example, input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to the crankshaft 40 via a flywheel (not shown) to enable a starting operation of the engine 10.

Combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via intake valve 52 and exhaust valve 54 respectively. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled directly to the cylinder 30 for injecting fuel directly therein. It will also be appreciated that the cylinder 30 may receive fuel from a plurality of injections during a combustion cycle.

In one example, the engine 10 may be a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals MAF and MAP to the controller 12.

Further, in the disclosed embodiments, an exhaust gas recirculation (EGR) system may route a desired portion of exhaust gas from the exhaust passage 48 to the intake manifold 44 via an EGR passage 140. The amount of EGR provided may be varied by controller 12 via an EGR valve 142. By introducing exhaust gas to the engine 10, the amount of available oxygen for combustion is decreased, thereby reducing combustion flame temperatures and reducing the formation of $NO_x$, for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust passage 48 upstream of an exhaust gas treatment system 150. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), NOx, HC, or CO sensor. The exhaust gas treatment system 150 is shown arranged along the exhaust passage 48 downstream of the exhaust gas sensor 126.

In the example shown in FIG. 1, the exhaust gas treatment system 150 is a urea based selective catalytic reduction (SCR) system. The SCR system includes at least a SCR catalyst 152, a urea storage reservoir 154, and a urea injector 156, for example. In other embodiments, the exhaust gas treatment system 150 may additionally or alternatively include other components, such as a particulate filter, lean $NO_x$ trap, three way catalyst, various other emission control devices, or combinations thereof. In the depicted example, the urea injector 156 provides urea from the urea storage reservoir 154. However, various alternative approaches may be used, such as solid urea pellets that generate an ammonia vapor, which is then injected or metered to the SCR catalyst 152. In still another example, a lean $NO_x$ trap may be positioned upstream of SCR catalyst 152 to generate $NH_3$ for the SCR catalyst 152, depending on the degree or richness of the air-fuel ratio fed to the lean $NO_x$ trap.

The exhaust gas treatment system 150 further includes a tailpipe exhaust gas sensor 162 positioned downstream of SCR catalyst 152. In the depicted embodiment, exhaust gas sensor 162 may be a $NO_x$ sensor, for example, for measuring an amount of post-SCR $NO_x$. Exhaust gas treatment system 150 may further include a feedgas exhaust gas sensor 158 positioned upstream of urea injector 156 and SCR catalyst 152. In the depicted embodiment, the feedgas exhaust gas sensor 158 may be a $NO_x$ sensor, for example, for measuring an amount of pre-SCR $NO_x$ received in the exhaust passage for treatment at the SCR catalyst.

In some examples, an efficiency of the SCR system may be determined based on the output of one or more of tailpipe exhaust gas sensor 162 and feedgas exhaust gas sensor 158. For example, the SCR system efficiency may be determined by comparing $NO_x$ levels upstream of the SCR catalyst (via sensor 158) with $NO_x$ levels downstream of the SCR catalyst (via sensor 162). In other embodiments, which do not include a dedicated NOx sensor 158 upstream of SCR catalyst 152, the conversion efficiency may be based on the exhaust gas sensor 126 (when the sensor 126 measures $NO_x$, for example) positioned upstream of the SCR system.

Exhaust system 150 further includes temperature sensor 160 placed just upstream and adjacent of SCR catalyst 152 to measure the temperature of exhaust gases entering the catalyst. Controller 12 may, thus, receive a measurement of a temperature of SCR catalyst 152 from a temperature sensor 160. Alternatively, sensor 160 may be positioned such that it provides an indication of exhaust manifold temperature.

Controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the sensor 122; and exhaust constituent concentration from the exhaust gas sensors 126 and 158. Engine speed signal, RPM, may be generated by controller 12 from signal PIP.

The storage medium read-only memory 106 can be programmed with non-transitory, computer readable data representing instructions executable by the processor 102 for performing the methods described below as well as other variants that are anticipated but not specifically listed. Example methods are described herein with reference to FIGS. 2-4.

As described above, FIG. 1 shows only one cylinder of a multi-cylinder engine, and each cylinder may similarly include its own set of intake/exhaust valves, fuel injector, spark plug, etc.

Figure 2:
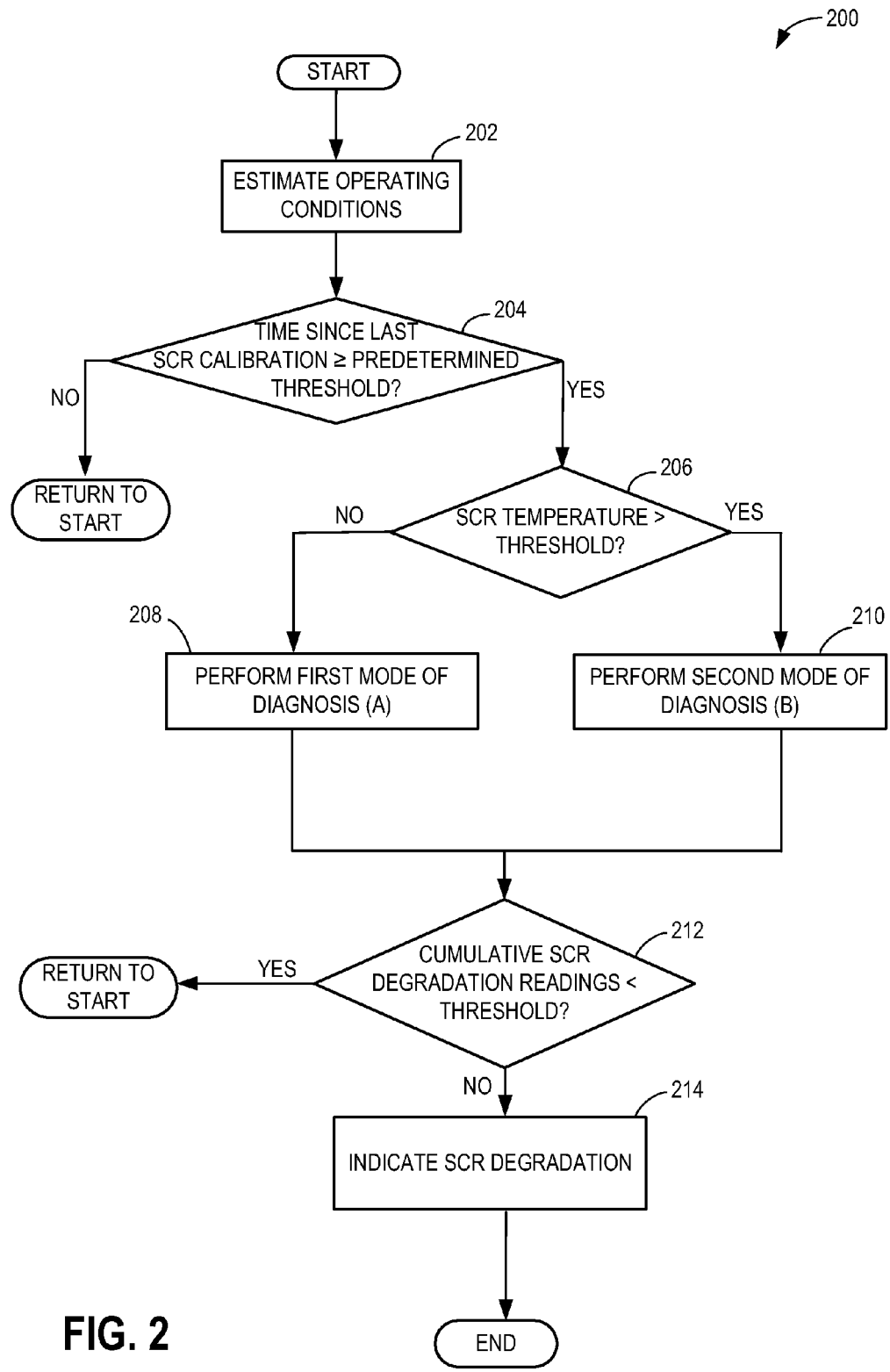
FIG. 2 depicts a flowchart illustrating a routine to diagnose a SCR device using different modes based on SCR catalyst temperature.

Now turning to FIG. 2 where an example routine 200 is shown for diagnosing degradation in a SCR catalyst. Specifically, the routine chooses one of two modes based on the temperature of the SCR catalyst and indicates SCR degradation based on cumulative data from both modes. The indication of degradation may include a message displayed to the vehicle operator that engine degradation has been identified, and may further include setting a diagnostic code stored in non-transitory memory corresponding to degradation of the SCR catalyst, and specifically identifying the SCR catalyst as the component that is degraded. The diagnostic code may be retrievable through an interface port on-board the vehicle.

At 202, routine 200 includes determining engine operating conditions. Operating conditions may include engine speed and load, engine temperature, engine out NOx levels, catalyst efficiency (as determined based on feedback from the exhaust sensors, for example) and SCR light-off (e.g., whether or not the SCR has reached its light-off temperature). For example, the diagnostic may wait until SCR catalyst reaches light-off before proceeding. As another example, the diagnostic may be performed only when the engine is operating and providing drive power to the vehicle to keep it in motion. At 204, it may be confirmed if it is an appropriate time to perform a SCR diagnostic routine. The SCR diagnostic routine may be indicated if a threshold amount of time has elapsed since a previous routine was performed. If the SCR diagnostic routine is not indicated, routine 200 returns to start.

If the time elapsed since a previous diagnostic routine is more than a threshold, at 206 it may be determined if SCR temperature is above a minimum threshold. SCR temperature may be inferred from the temperature of exhaust gases at the inlet to the SCR catalyst. For example, the minimum temperature threshold may be that over which SCR conversion efficiency is at a desired threshold level, greater than light-off efficiency and at or below peak efficiency. As another example, the routine may determine whether the temperature is such that the efficiency is within 10% of peak efficiency for a non-degraded SCR catalyst.

Figure 5:
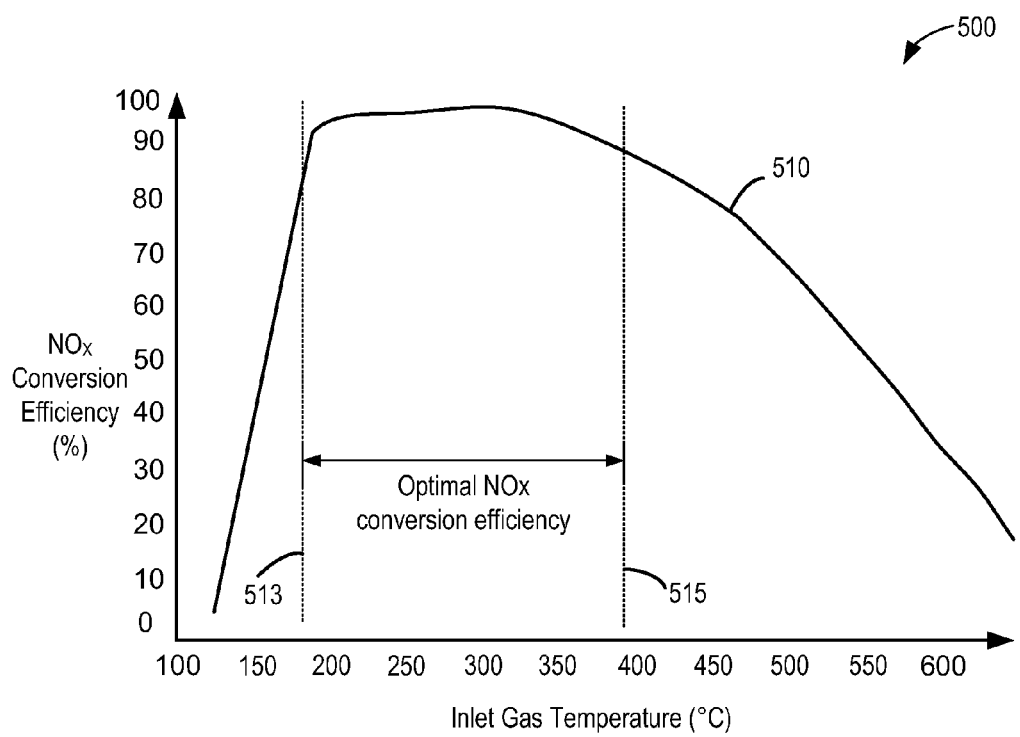
FIG. 5 shows a plot of SCR catalyst conversion efficiency versus SCR catalyst inlet gas temperature.

Referring now to FIG. 5, it shows a plot of SCR catalyst conversion efficiency versus SCR catalyst inlet gas (or feedgas) temperature. Map 500 represents an example of NOx conversion efficiency for SCR catalyst 152 of FIG. 1. The Y axis represents NOx conversion efficiency in percentage. The X axis represents SCR inlet gas temperature in degrees C.

Herein, SCR efficiency plot 510 shows that a SCR catalyst may have low NOx conversion efficiency at temperatures below 150° C. For example, NOx conversion efficiency at 150° C. is about 40 percent and lower for lower inlet gas temperatures. NOx conversion efficiency increases rapidly and reaches about 90 percent at about 185° C. as indicated by vertical marker 513. NOx conversion efficiency of SCR catalyst increases slowly at temperatures above 185° C. and approaches 100 percent efficiency. Near 390° C., NOx conversion efficiency is reduced back to about 90 percent as indicated by vertical marker 515. Beyond vertical marker 515, NOx conversion efficiency continues to decrease as SCR inlet temperature continues to increase. In this example, the region between vertical markers 513 and 515 may be a predetermined SCR catalyst operating region for a desired NOx conversion efficiency, as described with regard to 206.

Returning now to routine 200 of FIG. 2, a first mode of diagnosis (A) is chosen at 208 if SCR temperature is determined to be below the minimum temperature for desired operation (e.g., vertical marker 513 in FIG. 5). If it is determined that SCR temperature is above the minimum temperature threshold (e.g., vertical marker 513 if FIG. 5), a second mode of diagnosis (B) is chosen. Modes A and B will be further elaborated in FIGS. 4 and 5, respectively.

Each mode of SCR diagnosis may calculate conversion efficiency data and relate it to the presence or absence of SCR degradation. For example, a counter of degradation readings may be incremented by one if calculated SCR conversion efficiency is lower than an expected conversion efficiency. Likewise, if calculated efficiency is comparable or higher than expected conversion efficiency, the counter is not incremented. Thus, at 212, it may be determined if the cumulative SCR degradation readings obtained from modes A and B are higher than a minimum threshold. For example, the controller may receive considerable data from mode A of SCR diagnosis if the vehicle is primarily used for short distances or city driving in which situations SCR catalyst temperature does not reach the minimum required for peak NOx conversion. Therefore, depending on the sample size of readings obtained, the controller may choose to signal degradation (if indicated) or wait for readings acquired from mode B of SCR diagnosis. For example, if a substantial number of degradation readings are acquired only during mode A, the controller may signal degradation. In another example, if diagnosis results obtained with mode A are of a diverse nature, the controller may wait to acquire more data from mode B of SCR diagnosis. As such, data of a diverse nature indicates a mix of "pass" or "degraded" readings.

If it is established that the cumulative degradation readings are higher than the threshold, routine 200 indicates SCR degradation at 214 and may turn on a malfunction indicator lamp (MIL) on the dashboard. If the number of degradation readings is determined to be lower than a threshold, routine 200 returns to the start and continues to perform diagnostic routines when operating conditions are met.

Turning now to FIG. 3, it describes an example routine 300 that demonstrates mode A of SCR diagnosis performed by controller when SCR temperature is determined to be lower than a minimum threshold but higher than light-off temperatures. Specifically, routine 300 calculates SCR conversion efficiency based on a difference in NOx level readings pre- and post-SCR catalyst and compares the calculated conversion efficiency with an expected efficiency. Multiple readings may be obtained to ensure higher reliability.

At 302, NOx concentration in exhaust gases entering SCR catalyst (NOx_IN) may be determined from a NOx sensor placed upstream of SCR catalyst. At 304, NOx concentration in exhaust gases exiting the SCR catalyst (NOx_OUT) may be determined from a NOx sensor placed downstream of the catalyst. At 306, a NOx conversion efficiency may be estimated based on the percentage relative change between NOx_IN and NOx_OUT. For example, when feedgas NOx levels (NOx_IN) are 70 ppm and NOx levels in gases exiting SCR (NOx_OUT) are 35 ppm, conversion efficiency can be calculated to be 50%.

Next at 308, the calculated conversion efficiency may be compared with an expected conversion efficiency at that temperature. If it is determined that the calculated efficiency is lower than expected efficiency, at 310, the controller increments a counter of degradation readings by one and returns to start. On the other hand, if calculated efficiency is determined to be comparable to an expected conversion efficiency, the routine returns to start and waits to perform the diagnostic again when necessary conditions are met.

Referring now to FIG. 4, it shows an example routine 400 including mode B of SCR diagnosis that may be performed by the controller when SCR temperature is above a minimum threshold. Specifically, feedgas NOx levels are artificially and temporarily raised to improve the accuracy of NOx sensor readings and SCR conversion efficiency is calculated under higher feedgas NOx conditions.

At 402, it may be determined if the SCR catalyst is in a steady warmed up condition. As such, this may indicate that SCR device has achieved light-off and is able to reduce NOx in exhaust gases. If it is determined that SCR catalyst has not reached light-off, the routine disables the diagnostic at 404 and returns to start in routine 200. If it is confirmed that SCR catalyst has achieved light-off, at 406, it may be confirmed if SCR catalyst conversion efficiency is higher than a minimum threshold. For example, it may be determined if the catalyst is operating within the desired efficiency range as described earlier in reference to FIG. 5. For example, routine 400 may continue with mode B SCR diagnosis only when SCR conversion efficiency is measured to be 90% or more. If SCR conversion efficiency is determined to be lower than the minimum threshold, at 404 the diagnostic is abandoned and returns to start of routine 200 to wait for operating conditions to be met.

If SCR conversion efficiency is determined to be higher than a minimum threshold, at 408, it may be confirmed if feedgas NOx levels are lower than a minimum threshold. This helps determine the amount of artificial increase in NOx that may be scheduled to provide a higher accuracy in conversion efficiency determinations. In one example, NOx levels in exhaust gases may be held below minimum requirements by increased EGR flow to the intake when a vehicle is travelling at highway speeds with minimal loads. In another example, feedgas NOx levels may be higher than a threshold due to elevated engine loads during uphill driving conditions.

Map 600 of FIG. 6 illustrates a relationship between NOx levels in exhaust gases exiting the engine and the necessary artificial increases to feedgas NOx levels. The Y-axis represents artificial increases to NOx levels while the X-axis represents the temperature at a SCR inlet.

Plot 610 depicts the variation in the scheduled artificial increases to NOx levels in feedgas with temperature when engine output of NOx is higher. Plot 612 shows the variation in scheduled artificial increases to NOx levels when engine output of NOx is lower while plot 614 demonstrates the variation when engine output of NOx is lowest. Vertical markers 613 and 615 depict the peak conversion efficiency range of the SCR catalyst.

It may be noted from map 600 that as NOx levels in exhaust gases exiting the engine reduce, a larger artificial increase in NOx levels is scheduled to raise feedgas NOx levels in gases entering the SCR catalyst. For example, if the NOx levels entering the SCR catalyst are 50 ppm and the controller determines to raise NOx levels to 200 ppm for a mode B SCR diagnosis, an increase of 150 ppm is selected. If the NOx levels in exhaust gases exiting the engine are about 100 ppm, the controller will increase feedgas NOx levels by 100 ppm to reach the necessary 200 ppm NOx levels for mode B diagnosis.

In one example, feedgas NOx levels can be raised artificially by reducing EGR flow to the intake manifold. Reducing EGR under certain conditions can improve fuel efficiency. In another example, naturally increased NOx levels during uphill driving conditions may be opportunistically used to perform a mode B type of SCR diagnosis, thus enabling less artificial increases in engine out NOx. In yet another example, fuel injection timing may be advanced to produce higher NOx levels.

If it is determined that NOx levels in exhaust gases exiting the engine are above a minimum threshold, at 410, a smaller artificial increase in feedgas NOx levels may be produced. For example, EGR flow may be reduced by 5% to enhance the levels of NOx. If, however, it is determined that NOx levels in the exhaust are lower than the minimum threshold, a larger artificial increase in feedgas NOx may be generated at 412. For example, EGR may be reduced by 15%. As such, the reduction in EGR and consequent artificial increase in NOx levels is dependent on initial NOx levels in exhaust gases.

Once feedgas NOx levels are increased artificially, NOx concentration in exhaust gases entering SCR catalyst (NOx_IN_B) may be determined from a NOx sensor placed upstream of SCR catalyst at 414. At 416, NOx concentration in exhaust gases exiting the SCR catalyst (NOx_OUT_B) may be determined from a NOx sensor placed downstream of the catalyst. At 418, a NOx conversion efficiency may be estimated based on the relative change between NOx_IN_B and NOx_OUT_B. The temporary artificial increase in feedgas NOx levels can help improve signal-to-noise ratio in NOx sensor feedback and may provide a more precise determination of conversion efficiency when SCR device temperature is in the peak conversion range.

In one example, when SCR device conversion efficiency is expected to be in its peak range, a feedgas NOx sensor may determine NOx_IN_B as 50 ppm with +/−20% error and a tailpipe NOx sensor may measure NOx_OUT_B as 10 ppm with an error of +/−10 ppm. Therefore, the normal value of conversion efficiency may be estimated as 80% but with a variance from 50% to 100% efficiency because of sensor errors. With a wider variance in calculated conversion efficiencies, determination of SCR device degradation may be inaccurate. For example, a SCR device with 60% calculated efficiency may not be signaled as degraded because a 60% efficiency falls within the range of 50%-100%. Now, if feedgas NOx levels can be increased such that the feedgas NOx sensor measures NOx_IN_B as 200 ppm with +/−20% error and a tailpipe NOx sensor measures NOx_OUT_B as 80 ppm+/−10 ppm, the normal value of conversion efficiency may be estimated as 60% but with a narrower variance from 44% to 70%. However, if the expected conversion efficiency is at least 80%, a mean calculated conversion efficiency value of 60% is significantly lower than the expected 80% and the SCR device may be more accurately diagnosed as degraded. Thus, increasing the feedgas NOx output can assist in improving signal-to-noise ratio in NOx sensor feedback and therefore, enhance reliability of SCR monitoring. Further, by adjusting the amount of temporary engine out NOx increase depending on operating conditions, only as much excess NOx as is needed to improve conversion efficiency determination is used, thus improving overall operation and reducing disturbances to engine operation. For example, the closer the temperature is to a peak conversion efficiency, the greater the artificial NOx increase, and vice versa. Additionally, the lower the engine out NOx levels during efficiency monitoring, the greater the artificial NOx increase, and vice versa At 420, the calculated conversion efficiency may be compared with an expected conversion efficiency at that temperature. If it is determined that the calculated efficiency is lower than an expected efficiency, at 422, the controller increments a counter of degradation readings by one and returns to start. On the other hand, if calculated efficiency is determined to be comparable to an expected conversion efficiency, the routine returns to start and waits to perform the diagnostic again when necessary conditions are met.

It will be appreciated that higher levels of NOx are generated only when the SCR catalyst is operating in a high efficiency region. This ensures that a large portion of NOx entering the catalyst is reduced and tailpipe emissions of NOx are maintained within acceptable limits while mode B of SCR diagnosis is being executed. Thus, mode B of SCR diagnosis may be disabled if SCR device is not functioning in its peak performance range.

It will be further appreciated that reducing EGR flow to artificially increase feedgas NOx levels may result in stable combustion conditions and reduced fuel consumption. In another example, feedgas NOx may be increased by advancing fuel injection timing which can also benefit fuel efficiency. Therefore, an assessment of the SCR device may be performed during continuous engine operation and vehicle motion which can positively affect fuel economy without significant negative effects on vehicle driveability. Further, by monitoring and collecting SCR performance results over a range of SCR operating temperatures a more accurate diagnosis of SCR degradation can be made.

An example SCR diagnosis illustrating the two modes is described with reference to FIG. 7. Map 700 of FIG. 7 portrays the conditions under which an artificial increase in NOx may be generated. Map 700 depicts SCR diagnosis results at plot 702, EGR flow at plot 704, expected SCR conversion efficiency at plot 706, calculated SCR conversion efficiency at 708, SCR temperature at plot 710, measured NOx output from engine at plot 712 and vehicle speed (Vs) at plot 714. All plots are depicted over time, plotted along the x-axis. Additionally, line 707 represents a minimum threshold limit for SCR conversion efficiency, lines 713 and 715 represent the minimum and maximum threshold limits respectively for SCR temperature and line 717 corresponds to a minimum threshold of NOx levels in exhaust gases.

Prior to t1, vehicle speed (Vs) increases rapidly from a stationary state. EGR flow may be reduced or disabled during periods of high engine speed and wide open throttle conditions. Prior to t1, NOx levels rise steadily, SCR temperature is below a minimum threshold (line 713) but above light-off temperature and SCR conversion efficiency is lower than a minimum (line 707). Under these operating conditions, mode A of SCR diagnosis may be performed to calculate SCR conversion efficiency. At t1, SCR temperature reaches the minimum threshold, SCR conversion efficiency increases to above the minimum threshold for peak NOx conversion and Vs stabilizes at a high speed. For example, the vehicle may be at cruising speeds on a highway and a higher EGR flow may be enabled to reduce NOx levels (plot 712) below a minimum threshold 717.

Between t1 and t2 all conditions for performing mode B of SCR diagnosis are met: SCR has achieved light-off, conversion efficiency is above a threshold 707 and NOx levels in exhaust gases are below a minimum threshold 717.

Therefore, at t2 EGR flow is reduced significantly resulting in increased NOx levels in the engine exhaust allowing for a more accurate conversion efficiency measurement (plot 708). Multiple conversion efficiency results may be obtained herein to improve the reliability of degradation diagnosis. Once a substantial number of results are obtained, EGR flow is increased at t3 to reduce NOx levels. Thus, NOx levels are temporarily increased for short intervals to minimize any negative impact on emissions.

At t4, another mode B diagnosis may be performed since SCR conversion efficiency remains in the peak range. As NOx levels are now above the minimum threshold, the reduction in EGR flow is lower than that needed at t2 (as elaborated earlier with reference to FIG. 6). With a reduction in EGR, NOx levels rise and SCR conversion efficiency is calculated again. It may be determined that calculated efficiency is comparable to expected efficiency numbers throughout the range of temperatures tested and SCR diagnosis indicates a "Pass" result (plot 702). At t5, the diagnosis ends and EGR flow is increased. Beyond t5, Vs decreases and eventually the vehicle may slow down to an eventual stop at t6.

Between t6 and t7, an extended time interval is indicated during which the vehicle may be used consistently. As such the plots after t7 are an example of SCR diagnosis when SCR catalyst is degraded.

At t7, vehicle speed (Vs) rises rapidly and between t7 and t12 the same three diagnoses steps may be performed with the two modes based on necessary conditions being met. Thus, between t7 and t8, mode A of SCR diagnosis is conducted since SCR temperature is below a minimum threshold. Between t8 and t9, operating conditions for mode B of SCR diagnosis are met and mode B diagnosis is performed between t9 to t10 and t11 to t12. The calculated conversion efficiency (plot 708) is significantly lower than expected conversion efficiency (plot 706) during all diagnosis steps over a range of SCR temperatures. Therefore, based on cumulative results from both diagnosis modes, the controller indicates degradation as shown in plot 702 between t7 and t12.

Note that even though conversion efficiency continues to be calculated between t1 and t2, t3 and t4, t8 and t9, and t10 and t11 the data may be less reliable than those results obtained when mode A and mode B types of SCR diagnosis are performed.

In this way, a SCR catalyst may be monitored over a range of SCR temperatures by selecting different diagnosis modes which enable a collective, and more precise, assessment of possible catalyst degradation. The SCR degradation analysis can be carried out in a vehicle in motion over longer durations of time to achieve a satisfactory number of results enabling a more reliable analysis. By increasing feedgas NOx levels when a SCR catalyst is performing at higher conversion efficiencies, errors in NOx sensor readings may be reduced to provide more precise feedback while retaining tailpipe emissions below minimum requirements. Further, using reduced EGR flow or an advanced fuel injection timing to artificially increase NOx levels in exhaust gases can deliver stable combustion and benefit fuel economy, respectively. Thus, SCR degradation may be assessed in a moving vehicle with minimal negative effects on driveability and emissions.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine including a SCR catalyst, the method comprising:
for a vehicle in motion:
in response to SCR temperature below a first threshold: monitoring SCR conversion efficiency in a first mode based on NOx-in and NOx-out concentrations, but without adjusting engine operation to artificially increase feedgas NOx;
in response to SCR temperature above the first threshold, artificially increasing feedgas NOx by adjusting an EGR valve to reduce EGR flow, and monitoring SCR conversion efficiency in a second mode based on NOx-in and NOx-out concentrations; and
indicating SCR degradation based on the monitored conversion efficiency from each of the first and second modes.

2. The method of claim 1, wherein NOx sensors are positioned immediately upstream and downstream of the SCR catalyst.

3. The method of claim 1, wherein when SCR temperature is above the first threshold, feedgas NOx levels are increased by advancing fuel injection timing, the artificial NOx increase being smaller when feedgas NOx is greater than a threshold, and being larger when feedgas NOx is smaller than the threshold.

4. The method of claim 1, wherein SCR degradation is indicated based on the monitored conversion efficiency with and without the artificial NOx increase.

5. The method of claim 1, wherein during the vehicle motion and the SCR conversion efficiency monitoring, the engine is operated, and maintained operating, to provide all drive power to the vehicle to maintain vehicle motion.

6. The method of claim 1, wherein the SCR catalyst is operating under steady warmed up conditions.

7. The method of claim 1, wherein feedgas NOx levels are artificially increased only when SCR catalyst conversion efficiency is above a minimum threshold.

8. The method of claim 1, wherein feedgas NOx levels are artificially increased only when a level of NOx in feedgas is below a threshold.

9. A method for monitoring performance of a SCR catalyst in an engine with NOx sensors, the method comprising:
operating the engine in a first mode when SCR temperature is below a first threshold and monitoring SCR conversion efficiency;

operating the engine in a second mode when SCR temperature is above the first threshold and feedgas NOx concentration is above a threshold, by artificially increasing feedgas NOx by a first amount and monitoring SCR conversion efficiency;

operating the engine in the second mode when SCR temperature is above the first threshold and feedgas NOx concentration is below the threshold, by increasing feedgas NOx by a second amount, the second amount greater than the first amount, and monitoring SCR conversion efficiency; and indicating SCR degradation based on cumulative monitored efficiency of the two modes.

10. The method of claim 9, further comprising monitoring SCR performance when a vehicle is in motion and the engine is maintained operating to provide drive power to the vehicle.

11. The method of claim 10, wherein during the second mode of engine operation, feedgas NOx levels are increased when SCR conversion efficiency is above a minimum threshold and when feedgas NOx levels are lower than a NOx threshold.

12. The method of claim 9, wherein feedgas NOx levels are artificially increased by reducing EGR flow or advancing fuel injection timing.

13. A system for an engine in a vehicle comprising:
a SCR catalyst;
one or more NOx sensors; and
a controller with computer readable instructions stored in non-transitory memory for:
when the vehicle is travelling:
during a first condition, when SCR catalyst temperature is below a first threshold,
evaluating SCR conversion efficiency in a first mode based on NOx-in and NOx-out concentrations; and
during a second condition, when SCR catalyst temperature is above the first threshold,
artificially raising feedgas NOx levels, the artificial NOx increase being smaller when feedgas NOx concentration is greater than a threshold, and being larger when feedgas NOx concentration is smaller than the threshold; and
monitoring SCR conversion efficiency in a second mode based on NOx-in and NOx-out concentrations.

14. The system of claim 13, further comprising an indication of SCR degradation based on monitored conversion efficiency during both conditions.

15. The system of claim 13, wherein during SCR conversion efficiency monitoring, the engine is operated, and maintained operating, to provide all drive power to the vehicle to maintain vehicle motion.

16. The system of claim 13, wherein during the second condition, feedgas NOx is increased temporarily by reducing EGR.

17. The system of claim 13, wherein during the second condition, feedgas NOx is increased temporarily by advancing fuel injection timing.

18. The system of claim 13, wherein feedgas NOx is increased only when NOx levels in exhaust gases entering the SCR catalyst reduce below a minimum threshold.

19. The system of claim 13, wherein NOx levels in exhaust gases are increased only when the SCR conversion efficiency is above a minimum threshold.

20. The system of claim 13, further comprising instructions for, during a third condition, when SCR catalyst temperature is higher than a first threshold and feedgas NOx levels are higher than a minimum threshold:
increasing feedgas NOx to a smaller degree;
monitoring SCR conversion efficiency; and
indicating SCR degradation based on measurements performed in all three conditions.

* * * * *